(12) United States Patent
Kedar-Dongarkar et al.

(10) Patent No.: US 8,560,155 B2
(45) Date of Patent: Oct. 15, 2013

(54) ADAPTIVE POWERTRAIN CONTROL FOR PLUGIN HYBRID ELECTRIC VEHICLES

(75) Inventors: Gurunath Kedar-Dongarkar, Auburn Hills, MI (US); Feisel Weslati, Troy, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 226 days.

(21) Appl. No.: 13/160,561

(22) Filed: Jun. 15, 2011

(65) Prior Publication Data

US 2012/0323413 A1 Dec. 20, 2012

(51) Int. Cl.
*B60L 9/00* (2006.01)
(52) U.S. Cl.
USPC .......................... 701/22; 180/65.21; 903/903
(58) Field of Classification Search
USPC ................. 701/22; 180/65.1, 65.21; 903/903
See application file for complete search history.

(56) References Cited

U.S. PATENT DOCUMENTS

| 2005/0228553 | A1 | 10/2005 | Tryon |
| 2005/0274553 | A1 | 12/2005 | Salman et al. |
| 2011/0114403 | A1* | 5/2011 | Hauger et al. ............. 180/65.25 |

FOREIGN PATENT DOCUMENTS

| DE | 102005024403 A1 | 1/2007 |
| DE | 102008010558 A1 | 9/2009 |
| DE | 102009041721 A1 | 3/2011 |
| WO | WO 2011/031933 A1 | 3/2011 |

* cited by examiner

*Primary Examiner* — Gertrude Arthur Jeanglaude
(74) *Attorney, Agent, or Firm* — Frederick A. Krieger

(57) ABSTRACT

A powertrain control system for a plugin hybrid electric vehicle. The system comprises an adaptive charge sustaining controller; at least one internal data source connected to the adaptive charge sustaining controller; and a memory connected to the adaptive charge sustaining controller for storing data generated by the at least one internal data source. The adaptive charge sustaining controller is operable to select an operating mode of the vehicle's powertrain along a given route based on programming generated from data stored in the memory associated with that route. Further described is a method of adaptively controlling operation of a plugin hybrid electric vehicle powertrain comprising identifying a route being traveled, activating stored adaptive charge sustaining mode programming for the identified route and controlling operation of the powertrain along the identified route by selecting from a plurality of operational modes based on the stored adaptive charge sustaining mode programming.

20 Claims, 8 Drawing Sheets

ADAPTIVE POWERTRAIN CONTROL FOR PLUGIN HYBRID ELECTRIC VEHICLES

GOVERNMENT INTEREST

This invention was made, at least in part, under U.S. Government, Department of Energy, Contract No. DE-EE0002720. The Government may have rights in this invention.

FIELD

The present disclosure relates to powertrain control in plugin hybrid electric vehicles (PHEVs).

BACKGROUND

Conventional hybrid electric vehicles combine internal combustion (IC) engines with electric propulsion systems to achieve better fuel economy than non-hybrid vehicles. Plugin hybrid electric vehicles (PHEVs) share the characteristics of both conventional hybrid electric vehicles and all-electric vehicles by using rechargeable batteries that can be restored to full charge by connecting (e.g. via a plug) to an external electric power source.

PHEVs are generally designed to operate in two modes. In the first mode, known as a charge depleting mode, vehicle operation results in a net discharge of the battery. Most PHEVs operate only the electric propulsion system in this first, charge depleting mode so as to provide all-electric operation. Charge depleting mode operation is generally continued until the battery charge drops below a threshold, at which time the PHEV operates in a second, charge sustaining mode. In the charge sustaining mode, the PHEV operates much like a conventional hybrid, using both the IC engine and electric propulsion system to keep the battery at a sufficiently high level of charge to enable, for instance, start/stop operation of the IC engine.

Generally, powertrain control in PHEVs is designed such that the PHEV aggressively operates in charge depleting mode from the beginning of each drive cycle. Charge depleting mode remains active until the battery charge level drops below a charge sustaining threshold. After this, the PHEV operates in charge sustaining mode. Thus, the IC engine, if and when it operates, will not likely be operated as efficiently as it could. Likewise, because the PHEV generally uses the electric propulsion system exclusively in the charge depleting mode, it too will likely not be operated as efficiently as it could. In a typical PHEV, the power needs of the vehicle are not known for any drive cycles, even if the vehicle is travelling a highly repeated route.

SUMMARY

A powertrain control system for a plugin hybrid electric vehicle. The system comprises an adaptive charge sustaining controller; at least one internal data source operably connected to the adaptive charge sustaining controller; and a memory connected to the adaptive charge sustaining controller for storing data generated by the at least one internal data source. The adaptive charge sustaining controller is operable to select an operating mode of the vehicle's powertrain along a given route based on programming generated from data stored in the memory associated with that route.

In one form, the powertrain control system further includes at least one navigational data source connected to the adaptive charge sustaining controller, wherein the memory also stores data generated by the at least one navigational data source, In another form, powertrain control system further includes at least one external data source operably connected to the adaptive charge sustaining controller.

A method of adaptively controlling operation of a plugin hybrid electric vehicle (PHEV) powertrain is provided. The method includes identifying a route being traveled. The method further includes loading the stored adaptive charge sustaining mode programming for the identified route, if stored adaptive charge sustaining mode programming exists for the identified route. The method further includes controlling operation of the PHEV powertrain along the identified route by selecting from a plurality of operational modes, the mode selection being defined by the stored adaptive charge sustaining mode programming.

In one form, the step of identifying the route being traveled includes empirically matching data from an initial period of vehicle operation to route identifying data associated with the stored adaptive charge sustaining mode programming.

In another form, the step of identifying the route being traveled includes evaluating navigational data collected in the initial period of vehicle operation.

In another form, the method further includes generating adaptive charge sustaining mode programming if no stored adaptive charge sustaining mode programming exists for the identified route.

In another form, wherein the generating step includes collecting vehicle data from a drive cycle start to end and analyzing the vehicle data to determine which operational mode is appropriate for each segment of the given route.

In another form, the method further includes collecting navigational data from the drive cycle start to end and using the navigational data in analyzing which operational mode is appropriate for each segment of the given route.

In another form, the method further includes altering the stored adaptive charge sustaining mode programming based on external data.

Further areas of applicability of the present disclosure will become apparent from the detailed description, drawings and claims provided hereinafter. It should be understood that the detailed description, including disclosed embodiments and drawings, are merely exemplary in nature intended for purposes of illustration only and are not intended to limit the scope of the invention, its application or use. Thus, variations that do not depart from the gist of the invention are intended to be within the scope of the invention.

DETAILED DESCRIPTION

Figure 1:
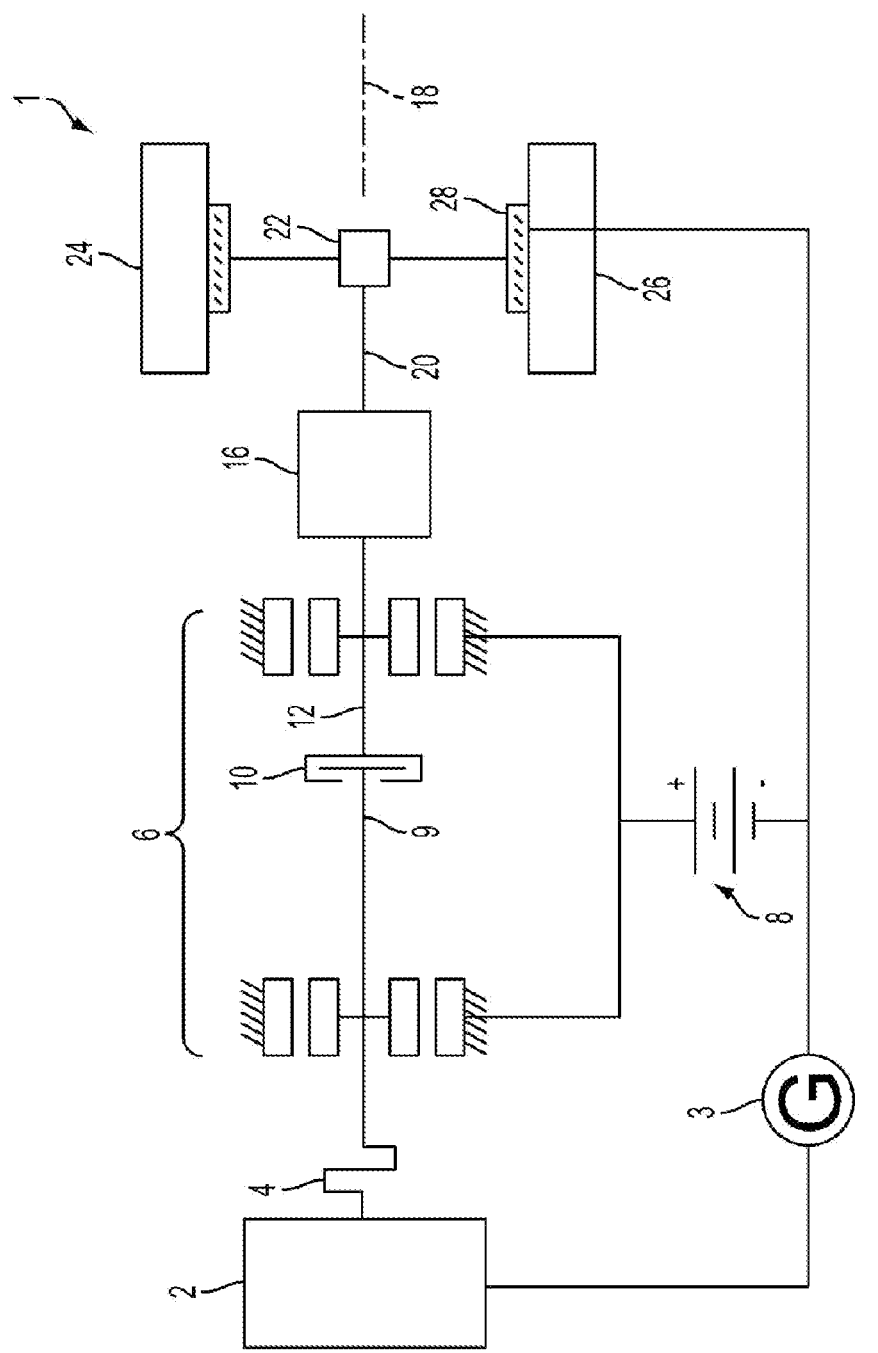
FIG. 1 is a schematic of a PHEV powertrain.

In one form, the present disclosure provides a new powertrain control methodology for plugin hybrid electric vehicles (PHEVs) that provides an adaptive charge sustaining mode in which the rate of battery depletion is based on statistical and empirical learning. Broadly, the PHEV is switched between the charge depleting and charge sustaining modes based on learned route attributes, e.g., distance, average rate of speed, and elevation changes, and/or driving conditions, e.g., temperature, precipitation, and traffic levels.

An adaptive system such as the one disclosed herein allows decisions to be made about the vehicle operating mode intelligently based on the drive history along a certain route, accounting for both driver preference and driving conditions. As a result, the percentage of time that the drivetrain operates in its Brake Specific Fuel Consumption (BSFC)-mapped maximum efficiency region would be higher compared to conventional PHEV operational strategies. An adaptive methodology will enable the vehicle to achieve higher fuel economy on a learned route compared to a static system.

It is well known that the discharge rate of a battery directly correlates to its efficiency. If the PHEV can be operated in charge sustaining mode (i.e., with the IC engine on) in a high efficiency region even in the early part of a drive cycle, the PHEV can be operated to conserve battery power and/or discharge the battery at a lower rate and increase overall fuel economy over the course of an entire drive cycle.

Generally, the route is determined based on driving history or empirical matching to the driver's initial route on starting a driving cycle. For instance, the certainty of the current route can be assured as the driver proceeds along an already learned path. As the confidence in the driver's heading increases, battery control strategy can be weighted more towards the optimum operation strategy that has been determined for that route, as opposed to nominal operation.

For routes that have been learned, i.e., those which programming has already been determined, adaptive powertrain control can optimize use of the charge depleting and charge sustaining modes where the methodology best determines use of each mode is appropriate. Where distance and drive cycle attributes are learned, the PHEV need not necessarily choose the charge depleting mode from the start of the drive cycle to the point where the battery charge falls below the charge sustaining threshold. For instance, the PHEV can operate in a charge depleting, all electric mode for the entirety of a 20 mile commute except a short sustained elevation climb portion at the very beginning of the route that would normally result in near complete depletion of the battery. Without the adaptive change, the PHEV would have operated in charge depletion mode for the climb, thus requiring the PHEV to operate in charge sustaining mode for the entire return trip.

The adaptive charge sustaining methodology can be used to deliberately constrain battery power based on the distance to be driven and the type of route to be taken. This strategy enhances the charge depletion mode range of the vehicle by allowing the system to turn the IC engine on (switch to charge sustaining mode) more aggressively during portions of the route where it would be more efficient to use the IC engine instead of the electric propulsion system.

In another embodiment described herein, learning need not be based on actual driving. Learning can be based on evaluating certain characteristics of an entered route (i.e., in a GPS navigation system) and comparing them to operational characteristics of the PHEV (i.e., rate of battery charge depletion at certain speeds, or at certain elevation grades). The characteristics of the new route can also be evaluated based on their similarity to already learned routes. Specifically, programming for portions for already learned routes that are repeated can be recycled to generate programming for new routes.

In yet another embodiment, the powertrain control system can perform certain operations, e.g., warming up/conditioning the batteries, at a certain interval before expected execution of a route. For instance, battery conditioning can occur every weekday a certain time before the driver is known to operate the vehicle (i.e., every day the driver leaves for work at 7:00 AM, so the powertrain control system begins battery conditioning at 6:45 AM)

FIG. 1 illustrates an exemplary plugin hybrid electric vehicle (PHEV) powertrain 1 usable with the system described herein. The PHEV powertrain 1 contains the following elements arranged in the direction of power transmission of an internal combustion (IC) engine 2, an engine power-output shaft 4 (a crankshaft), an electric propulsion system 6, a battery system 8 for powering the electric propulsion system 6, an engageable propulsion drive clutch 10, a transmission power-input shaft 12, and transmission 16. These elements are all arranged axially relative to a rotational centerline 18. A transmission output shaft 20 can drive vehicle wheels 24 and 26 via a differential 22. A regenerative braking system 28 is installed on wheels 24/26 to provide electric power to battery system 8 as the vehicle's brakes are engaged. Battery system 8 can also draw supplemental charge via a generator 3 driven by the IC engine 2.

Figure 2:
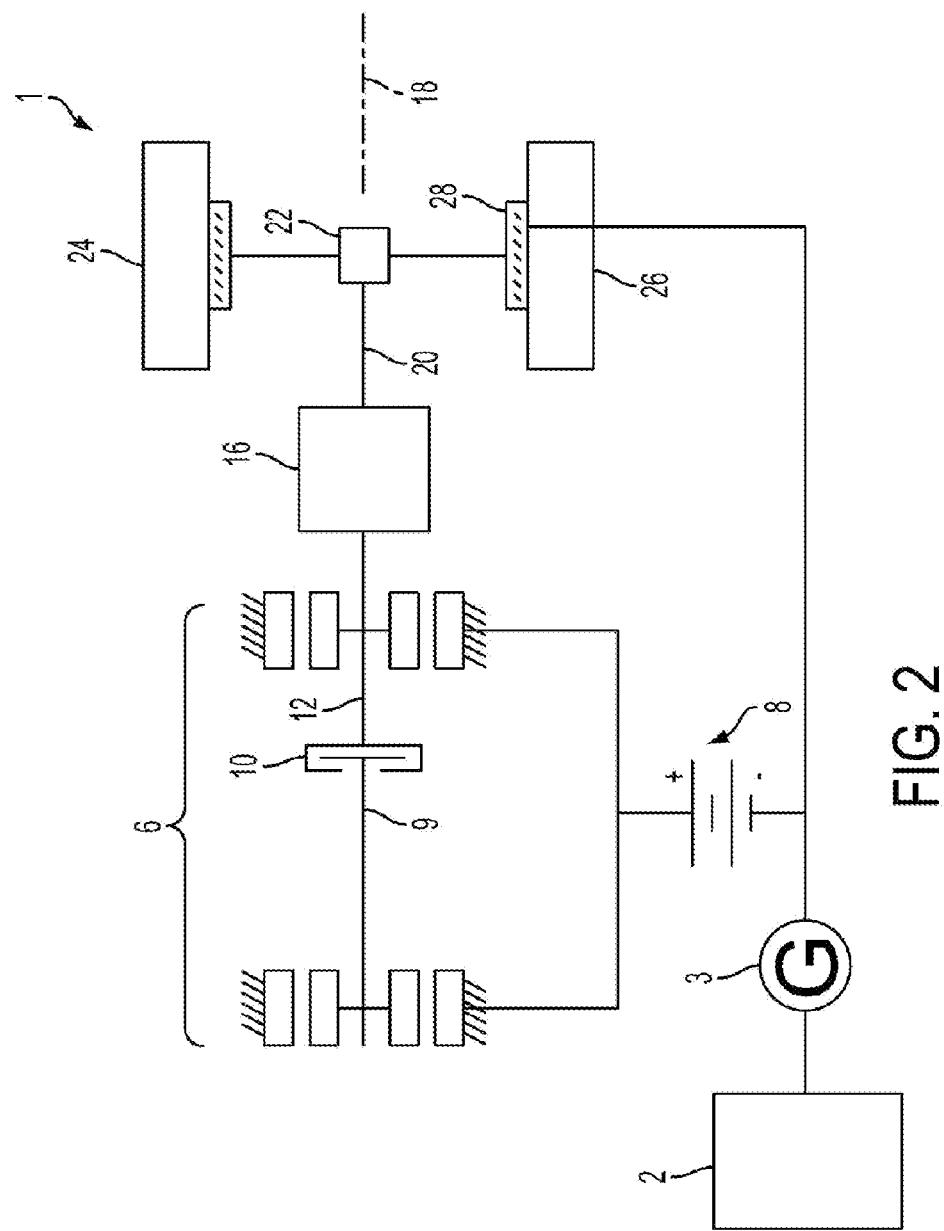
FIG. 2 is a schematic of a PHEV powertrain having an alternate configuration.

FIG. 2 illustrates an alternate embodiment of PHEV powertrain 1 in which the IC engine 2 is not directly connected to the propulsion drive clutch, and engine power-output shaft 4 is omitted. Instead, the IC engine 2 is connected directly to generator 3, which is connected to battery system 8 and which provides battery system 8 with electric power. As in FIG. 1, the battery system 8 also obtains charge from a regenerative braking system 28.

Figure 3:
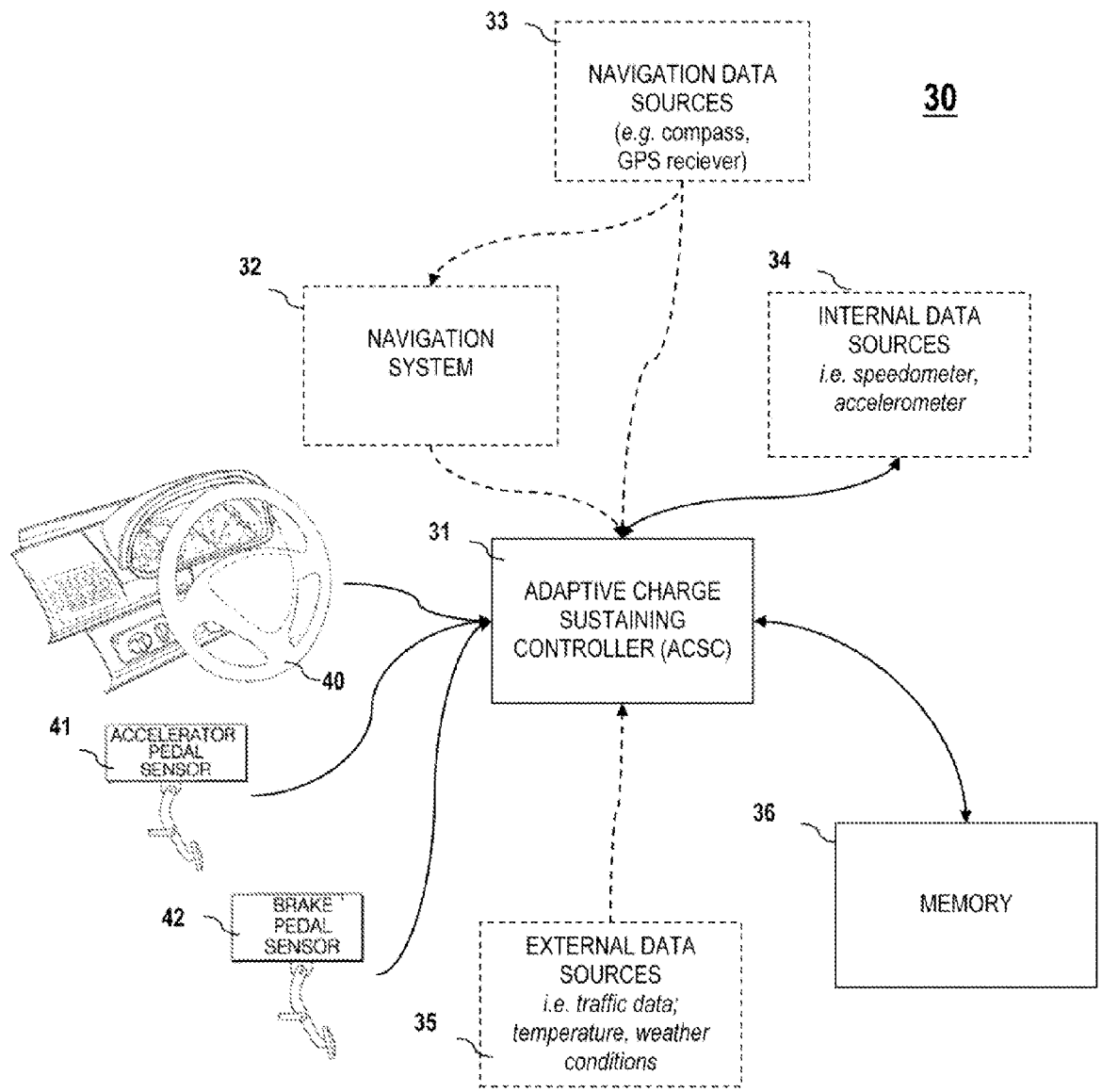
FIG. 3 is a schematic of a PHEV powertrain control system.

FIG. 3 illustrates a PHEV powertrain control system 30 for controlling PHEV powertrains, for example but not limited thereto, PHEV powertrain 1 as shown in either FIG. 1 or 2. An adaptive charge sustaining controller (ACSC) 31 takes as inputs one or more internal data sources 34 (e.g., speedometer, accelerometer) and driver input information from, e.g., steering column 40, accelerator pedal sensor 41 and brake pedal sensor 42. Optionally, ACSC 31 can also be connected to a navigation system 32, one or more navigation data sources 33 (e.g., compass or GPS receiver), and/or one or more external data sources 35 (e.g., traffic data, temperature, or weather conditions). ACSC 31 drives the PHEV powertrain control system 30 in an adaptive charge sustaining mode in which the rate of battery depletion is based on statistical and empirical learning. Battery depletion is controlled by alternating between charge depleting and charge sustaining modes as needed based on, e.g., the route of travel. The adaptive charge sustaining mode programming is stored in a memory 36 connected to or contained within the ACSC 31, which can be a programmed processor or other type of controller. The functions performed by ACSC 31 can also be integrated into the vehicle's powertrain control software.

Figure 4:
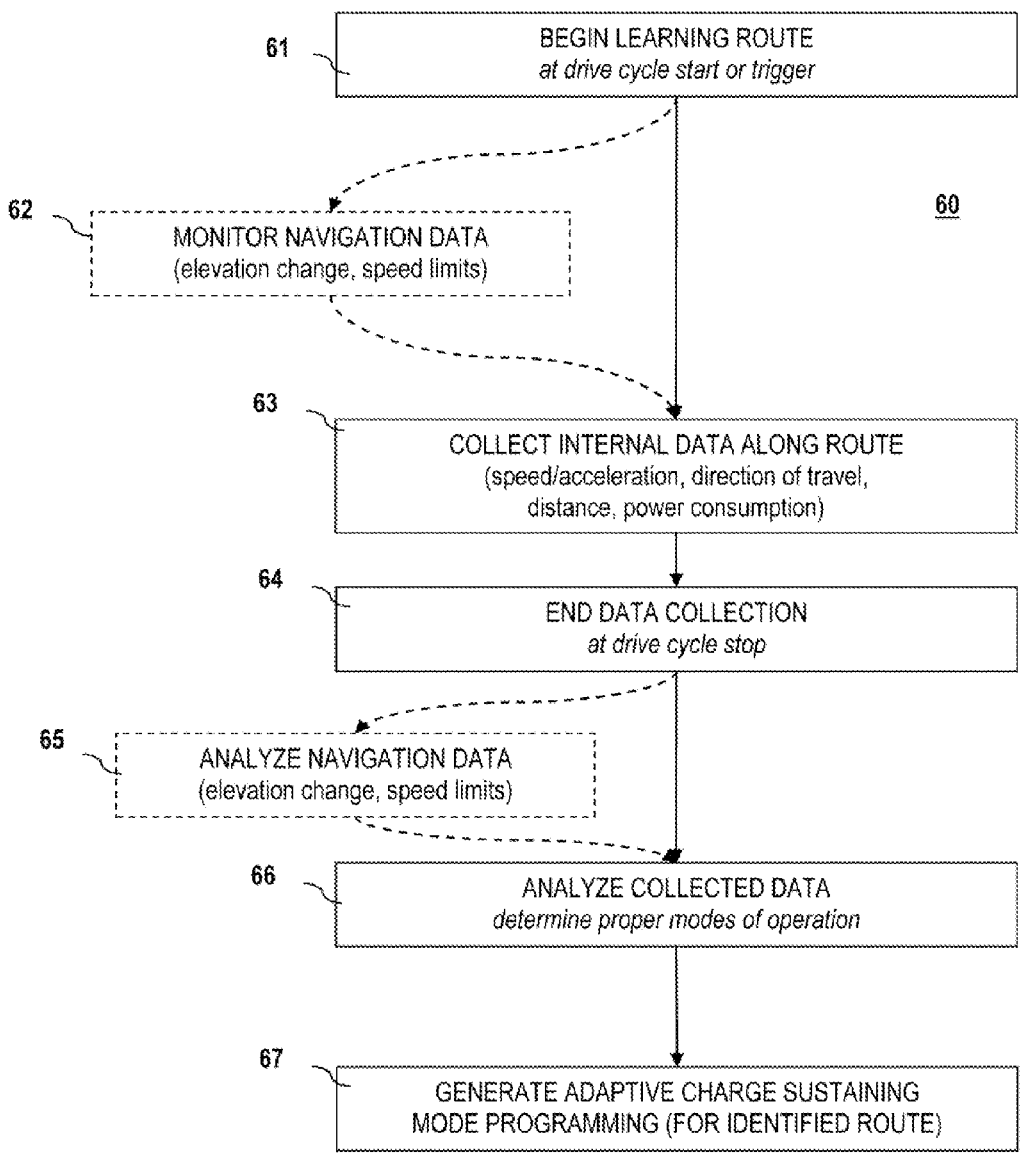
FIG. 4 is an example process, performed by the FIG. 3 powertrain control system, in which adaptive charge sustaining mode programming is generated for a learned route.

FIG. 4 illustrates a route learning methodology 60 used by ACSC 31 to develop new adaptive charge sustaining mode programming. At step 61, route learning commences at the beginning of a drive cycle, e.g., when the vehicle is started, or when the vehicle is operated for a sufficient period of time. Alternately, ACSC 31 can be instructed to start route learning by driver input, such as by entering a destination into navigation system 32. As the driver operates the vehicle, the ACSC 31 logs internal data collected along the route being driven (step 63). Inputs that are logged typically include speed/acceleration rate, distance traveled, and power consumption. Optionally navigation data can be logged as well from navigation elements 33 or navigation system 32, storing data such as elevation, grade, heading, location, speed limit, or the like (step 62). Breaking data can correlate to traffic congestion and a number of traffic lights/stops along a given route taken one or more times for data that the ACSC learns, adjusts thereto, and thereafter provides modes of operation based on the learned data and analysis thereof. Once the drive cycle is complete, e.g., when the vehicle is turned off or placed in park, ACSC 31 ends data collection (step 64).

At step 66, the data collected is analyzed to determine which modes of operation should be used at which times on the learned route. For instance, ACSC 31 can be programmed to prefer charge sustaining mode during expected periods of acceleration or increased power consumption, such as during a sustained elevation climb. Optionally, collected navigation data is injected into this determination (step 65). Once the programming is generated (step 67) it is stored for future use on the same route, or as mentioned above, for use in generating programming on similar routes.

Figure 5:
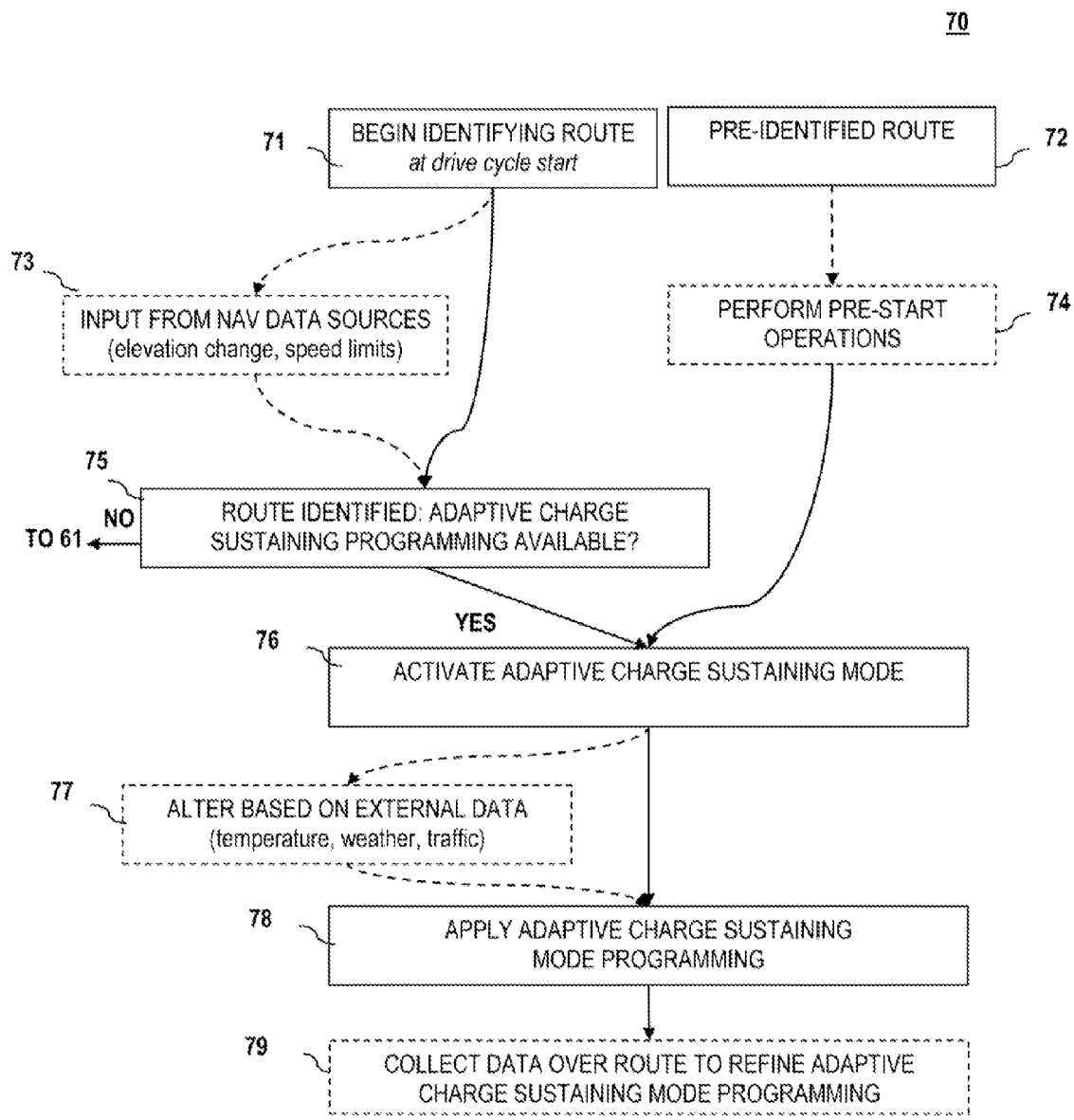
FIG. 5 is an example process, performed by the FIG. 3 powertrain control system, in which adaptive charge sustaining mode programming is applied on a learned route.

FIG. 5 illustrates an operational methodology 70 used by ACSC 31 to apply the adaptive charge sustaining mode programming developed in, e.g., methodology 60. At step 71, ACSC 31 will begin identifying the route at drive cycle start. Generally, the route is determined based on driving history or empirical matching to the driver's initial route. For instance, ACSC 31 will recognize the route by matching certain events as they occur, i.e., in a simplified example, identifying a driver's daily commute because it always starts with two left hand turns approximately 30 seconds apart followed by a right turn approximately three minutes later. [QUESTION FOR INVENTORS: Do you have any additional detail regarding what data/events are used to match the route?] In other words, identifying the route comprises empirically matching data from an initial period of vehicle operation to route identifying data associated with stored adaptive charge sustaining mode programming. Optionally, at step 73, input from navigation data sources 33 are used to enhance this determination. If a route is successfully identified (at step 75), ACSC 31 will load or activate the adaptive charge sustaining mode programming for that route (step 76). If the route cannot be identified, or it is determined the route has not previously been driven, ACSC 31 can start learning methodology 60.

The determination can also be pre-established (step 72). For instance, the driver can enter a destination into a navigation system 32, or ACSC 31 can learn that a particular route will be driven at a particular time (i.e., ACSC 31 can be programmed to know that the driver always commutes to work during the weekdays at 7:00 AM). If ACSC 31 already knows the route in advance, it can perform certain pre-start operations at step 74, e.g., preconditioning the battery system 8 before operation commences.

Once adaptive charge sustaining mode programming is activated (step 76), the PHEV will operate in either charge sustaining or charge depleting mode as determined by the ACSC 31 (step 78). Optionally, ACSC 31 can temporarily alter the programming based on input from external data sources 35 (e.g., traffic data, temperature, or weather conditions) (step 77). For instance, if high traffic levels are detected, preference for charge sustaining mode can be increased. Additionally, as a route is driven, further data can be collected to refine the adaptive charge sustaining mode programming for an existing route (step 79), as in methodology 60.

Although ACSC 31 will generally attempt to identify the route being driven with statistical confidence before applying the adaptive charge sustaining mode programming, ACSC 31 can also phase in the adaptive charge sustaining mode programming as the confidence in the driver's heading increases. Thus, the control strategy can be weighted more towards the optimum operation strategy that has been determined for that route, as it becomes clearer that the vehicle is actually on that route. In certain traveled routes the control strategy having learned and adapted to the various factors such as traffic conditions at different times of day will provide optimum operation strategy and direct the vehicle operation accordingly including any pre-start operations and operating between charge depleting and charge sustaining modes based on the learned data and current data.

It should also be noted that for pre-established/driver entered routes, an analysis can be performed based on navigational data to prepare preliminary adaptive charge sustaining mode programming, which can be later refined with information about the driver's driving preferences (as expressed through, among other things, monitored speed/acceleration rates).

Figure 6:
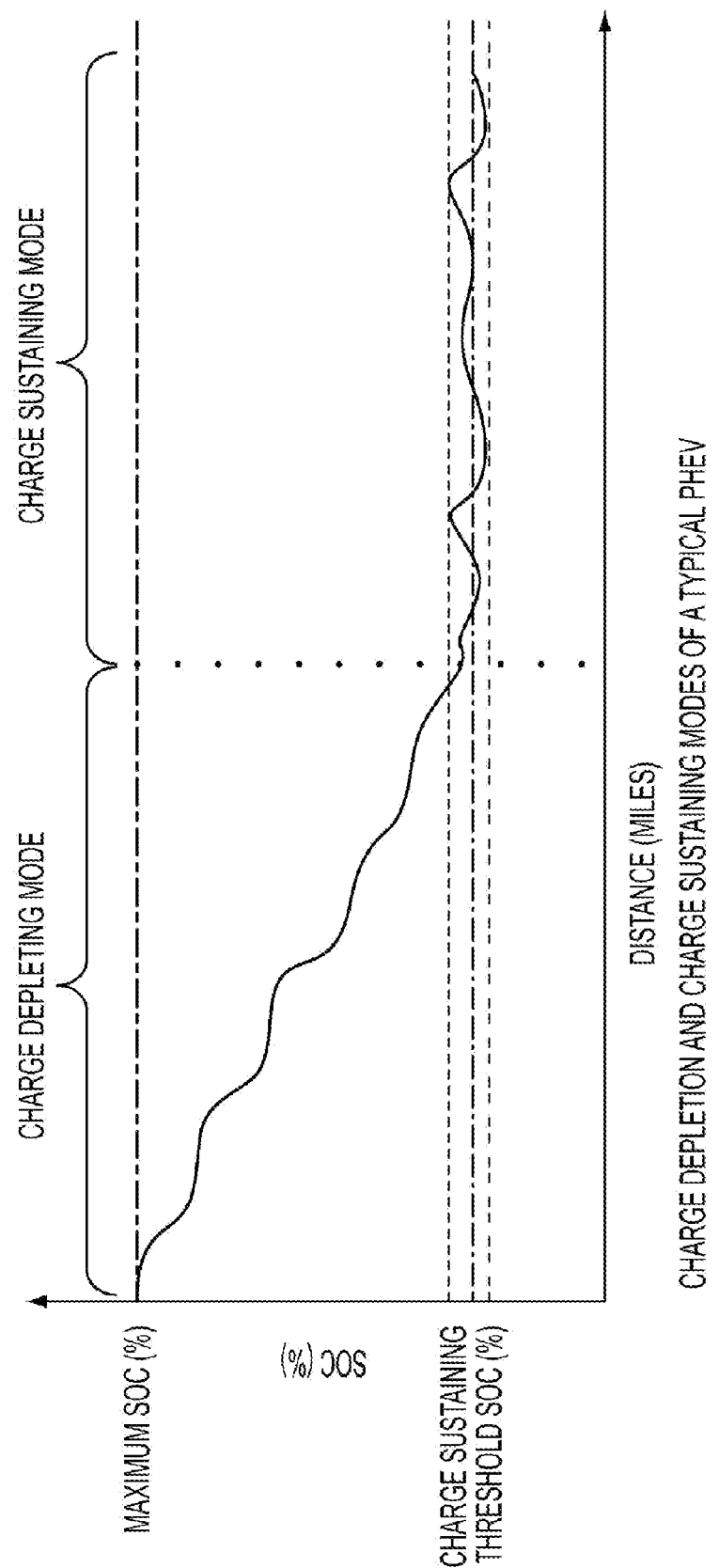
FIG. 6 is a graph showing battery charge levels in a typical PHEV operation over a drive cycle, i.e., operation in charge depletion mode until the battery crosses a charge sustaining threshold, then operation in charge sustaining mode.
Figure 7:
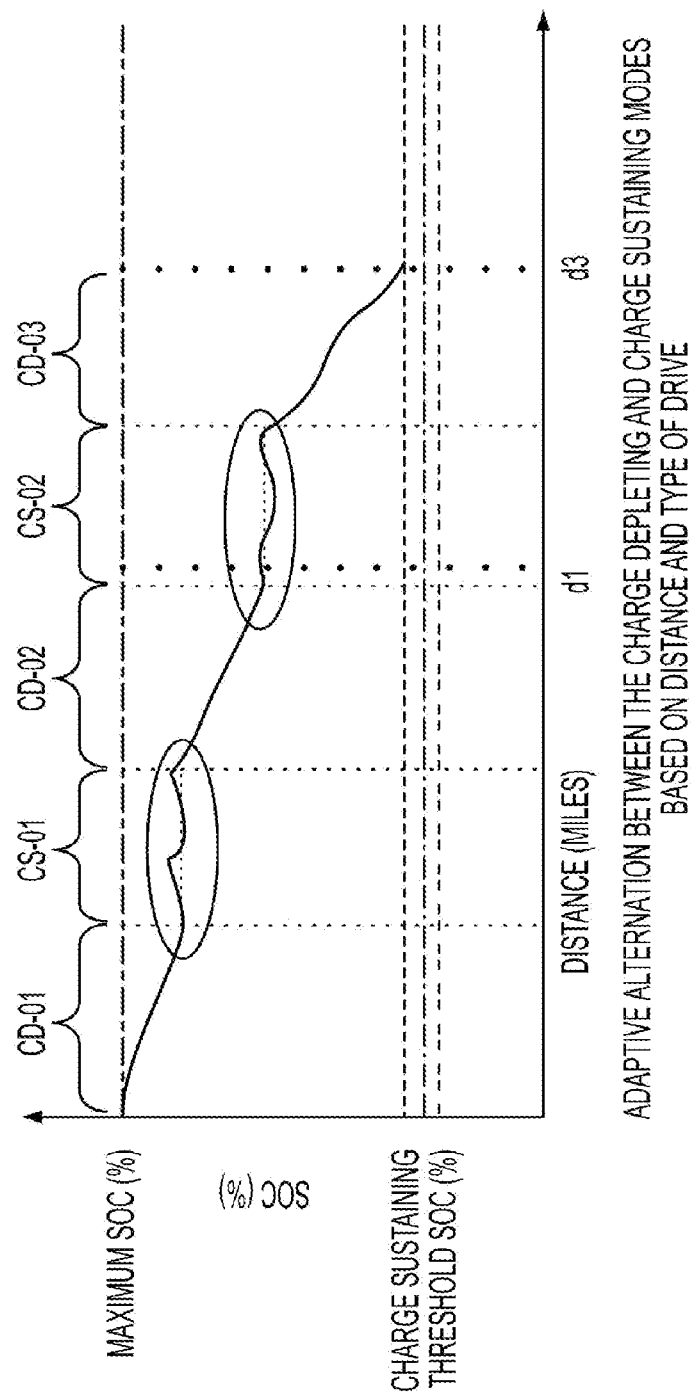
FIG. 7 is a graph showing battery charge levels in a PHEV with the battery control system described herein, showing adaptive alternation between charge depleting and charge sustaining modes based on distance and type of drive.
Figure 8:
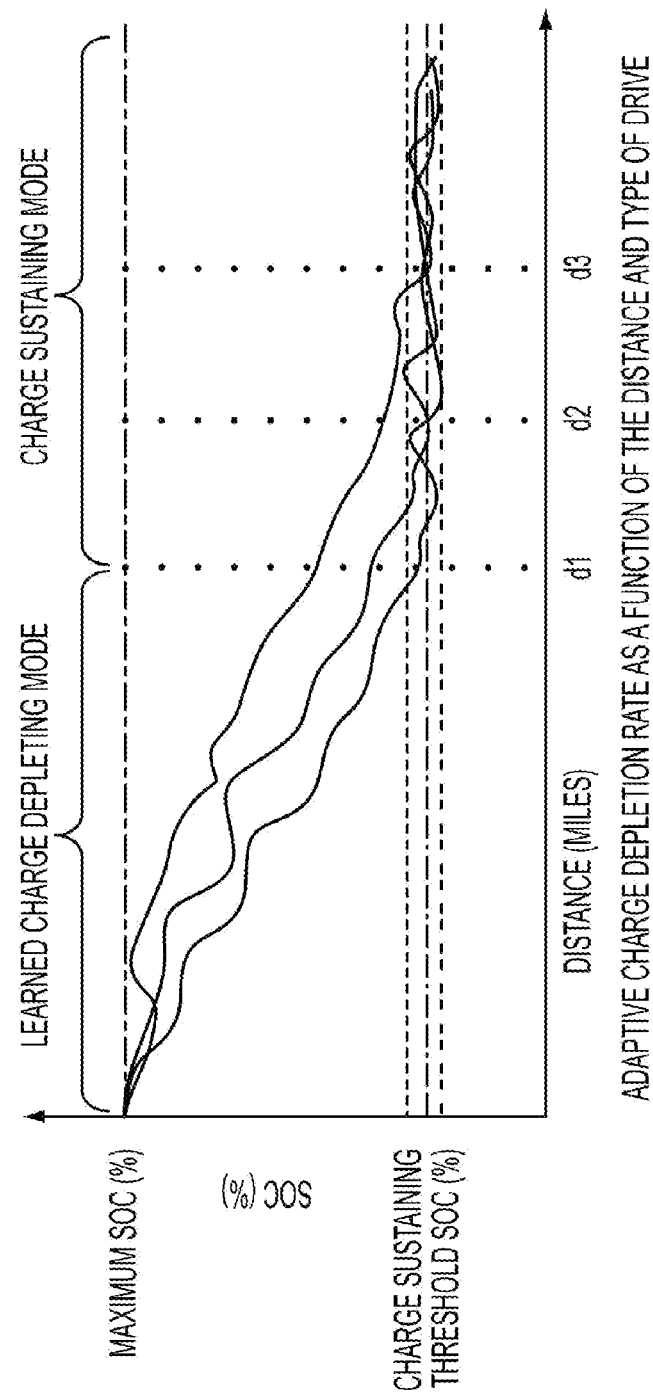
FIG. 8 is a graph showing battery charge levels in a PHEV with an alternate embodiment of a battery control system described herein, showing adaptive charge depletion as a function of distance and type of drive.

FIGS. 6-8 illustrate the effects of the present learning and execution methodologies 60, 70. FIG. 6 shows start of charge (SOC) levels in a typical PHEV operation over a drive cycle, i.e., operation in charge depletion mode until the battery crosses a charge sustaining threshold, then operation in charge sustaining mode. FIG. 7 shows SOC levels when the PHEV powertrain control system 30 and methodologies 60, 70 are used. As can be seen in FIG. 7, the adaptive control causes the PHEV powertrain to alternate between charge depleting and charge sustaining modes (indicated by e.g., CD-01, CS-01, with the circled regions showing switching to charge sustaining mode). FIG. 8 shows the positive effect of methodologies 60, 70 over longer distance (d1<d2<d3) drives in keeping SOC levels above the charge sustaining threshold.

What is claimed is:

1. A powertrain control system for a plugin hybrid electric vehicle (PHEV), the system comprising:
   an adaptive charge sustaining controller;
   at least one internal data source operably connected to the adaptive charge sustaining controller; and
   a memory connected to the adaptive charge sustaining controller for storing data generated by the at least one internal data source,
   wherein the adaptive charge sustaining controller is operable to select a mode of operation of a powertrain of the plugin hybrid electric vehicle along a given route based on programming generated from data stored in the memory associated with that route,
   wherein the adaptive charge sustaining controller is further operable to condition at least one battery in anticipation of vehicle operation.

2. The powertrain control system of claim 1, wherein the mode is one of a charge depleting mode or charge sustaining mode.

3. The powertrain control system of claim 1, wherein the at least one internal data source is an accelerometer or speedometer.

4. The powertrain control system of claim 1, further including at least one navigational data source connected to the adaptive charge sustaining controller, wherein the memory also stores data generated by the at least one navigational data source.

5. The powertrain control system of claim 1, wherein the at least one navigational data source is a compass or GPS receiver.

6. The powertrain control system of claim 1, further including a navigation system.

7. The powertrain control system of claim 6, wherein the route is identified by selection of a destination in the navigation system.

8. The powertrain control system of claim 1, further including at least one external data source operably connected to the adaptive charge sustaining controller.

9. The powertrain control system of claim 8, wherein the at least one external data source provides one of traffic, temperature, or weather data.

10. A method of adaptively controlling operation of a plug-in hybrid electric vehicle (PHEV) powertrain, the method comprising:
identifying a route being traveled;
loading stored adaptive charge sustaining mode programming for the identified route, if stored adaptive charge sustaining mode programming exists for the identified route; and
controlling operation of the PHEV powertrain along the identified route by selecting from a plurality of operational modes, the mode selection being defined by the stored adaptive charge sustaining mode programming.

11. The method of claim 10, wherein the step of identifying the route being traveled comprises empirically matching data from an initial period of vehicle operation to route identifying data associated with the stored adaptive charge sustaining mode programming.

12. The method of claim 11, wherein the step of identifying the route being traveled includes evaluating navigational data collected in the initial period of vehicle operation.

13. The method of claim 10, further including generating adaptive charge sustaining mode programming if no stored adaptive charge sustaining mode programming exists for the identified route.

14. The method of claim 13, wherein the generating step comprises: collecting vehicle data from a drive cycle start to end; and analyzing the vehicle data to determine which operational mode is appropriate for each segment of the given route.

15. The method of claim 14, further including collecting navigational data from the drive cycle start to end and using the navigational data in analyzing which operational mode is appropriate for each segment of the given route.

16. The method of claim 15, wherein the navigational data includes at least one of elevation change or speed limit.

17. The method of claim 14, wherein the vehicle data includes at least one of rate of speed, rate of acceleration, distance traveled, direction of travel or battery power consumption rate.

18. The method of claim 10, further including altering the stored adaptive charge sustaining mode programming based on external data.

19. The method of claim 18, wherein the external data includes at least one of traffic data, temperature or weather conditions.

20. The method of claim 10, wherein the route is predefined.

* * * * *